(No Model.)
C. T. HARNED.
INSECT TRAP.
No. 249,931. Patented Nov. 22, 1881.
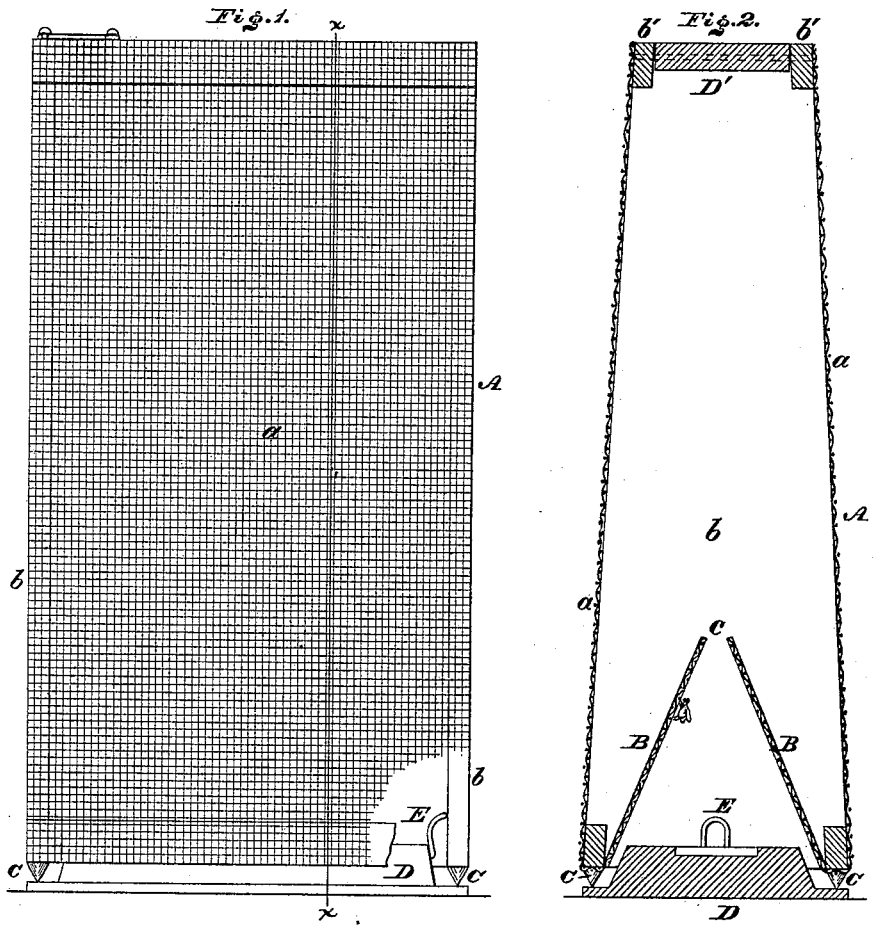
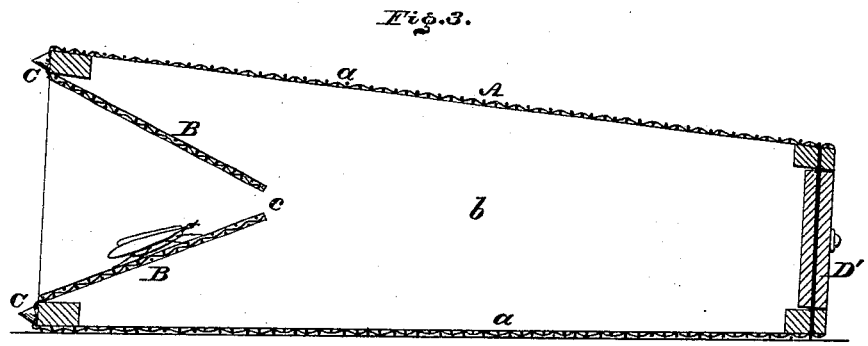
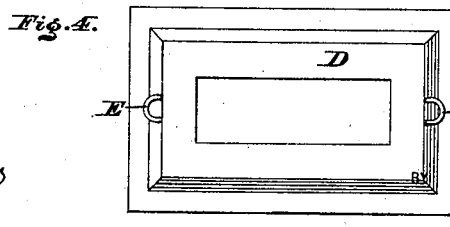
WITNESSES:
F. Cooper.
N. F. Kircher.
INVENTOR:
Chas. T. Harned,
John A. Wiedersheim
ATTORNEY.

UNITED STATES PATENT OFFICE.

CHARLES T. HARNED, OF PHILADELPHIA, PENNSYLVANIA.

INSECT-TRAP.

SPECIFICATION forming part of Letters Patent No. 249,931, dated November 22, 1881.

Application filed August 27, 1881. (No model.)

*To all whom it may concern:*

Be it known that I, CHARLES T. HARNED, a citizen of the United States, residing at Philadelphia, in the county of Philadelphia, State of Pennsylvania, have invented a new and useful Improvement in Insect-Traps, which improvement is fully set forth in the following specification and accompanying drawings, in which—

Figure 1 is a side elevation, partly broken away, of the insect-trap embodying my invention. Fig. 2 is a section thereof in line $x\ x$, Fig. 1. Fig. 3 is a view of a portion of Fig. 2 in a different position. Fig. 4 is a view of the inner face of the base of the trap reduced.

Similar letters of reference indicate corresponding parts in the several figures.

My invention consists of an insect-trap, the body of which is constructed of side pieces, end pieces, and guards, the latter being fitted in cuts of said end pieces, as will be hereinafter fully set forth.

Referring to the drawings, A represents the body of the trap of the form of a box, open at bottom and closed at top, having, if desired, for the purpose of inspection of the trap, its sides $a$ formed of reticulated material, which are secured to end boards or pieces, $b$, this construction also producing a light, strong, and serviceable body.

B represents converging guards, which, secured to the sides of the box, enter the body from the bottom thereof, and form the throat $c$ for the passage of the insects into the body.

Projecting downwardly from the bottom of the body A are studs or pins C, the object whereof is to prevent closing of the bottom of the body when the trap is placed upright on a support or on the base D, so that there is always provided at the bottom a space or inlet for the entrance of the insects. The base D is formed of a piece of suitable material, removably connected to the body A by means of spring-arms E, which rise from the piece, and are adapted to press against the inner sides of the body, and thus hold the base to the body.

The operation is as follows: When the trap is designed for flies and other small insects, a small quantity of sirup, sugar or other sweet substance is placed on the top of the base D, and the latter fitted to the bottom of the body, the spring-arms E connecting the parts, as has been explained. The flies, being attracted by the sirup, &c., enter the space between the body and base, and so reach the substance, and, after being satisfied, leave the spot, as usual, by rising, either flying upward or walking on the guards B, until they reach the throat $c$, through which they pass, and so enter the body A. The size of the throat is insufficient for the insects to return through the same by flying, and should they walk on the inner faces of the guards, they cannot proceed farther than the terminal top edges thereof, and so retrace their steps or fly from the guards, their capture being assured.

The trap may be discharged or cleansed by means of a door, D', hinged or fitted to the top frame, $b'$, of the body, the door, when the trap is in service, being properly secured.

For the purposes of catching roaches, &c., the base D is removed and the body set on its side, as in Fig. 3. A piece of cheese or other bait is placed in the body A, and the roach, in order to reach the same, ascends the lower guard B, and, passing the throat $c$, drops into the body, and is thus trapped, as its escape can be effected only through the throat, into which it cannot enter, for, should it walk on either of the guards and reach the terminal edges thereof, it cannot swing itself around said edges, and should this feat be attempted the insect will not be able to retain its hold on the edge, and so falls to the bottom of the body as set on its side.

In order to secure the guards to the sides $b$ in a firm and inexpensive manner, said sides are sawed, kerfed, or cut in converging directions. The side edges of the guards are fitted in said cuts or kerfs and bent around the bottom of the body.

The material of the sides $a$ of the body may be continuous with the guards, and passing from the bottom of the body is secured to the sides $b$ and top frame, $b'$, thereof.

Having thus described my invention, what I claim as new, and desire to secure by Letters Patent, is—

The trap having side pieces, $a\ a$, end boards, $b\ b$, and converging guards B, said end boards being formed with converging cuts, and said guards being fitted in said cuts and continuous with the side pieces, $a\ a$, substantially as and for the purpose set forth.

CHAS. T. HARNED.

Witnesses:
LUCRETIA J. THOMPSON,
JAMES M. MCCLELLAN.